United States Patent
Lee

(10) Patent No.: US 7,212,831 B2
(45) Date of Patent: May 1, 2007

(54) QUICK PAGING METHOD IN A SHADOW AREA

(75) Inventor: Jung-Hyeong Lee, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 1022 days.

(21) Appl. No.: 10/244,484

(22) Filed: Sep. 16, 2002

(65) Prior Publication Data

US 2003/0063579 A1 Apr. 3, 2003

(30) Foreign Application Priority Data

Sep. 29, 2001 (KR) ............................... 2001-61001

(51) Int. Cl.
*H04L 27/06* (2006.01)
(52) U.S. Cl. ..................................... 455/458; 370/320
(58) Field of Classification Search ............... 370/320, 370/333, 335, 342, 311, 329, 349; 455/458, 455/574, 464, 522
See application file for complete search history.

(56) References Cited

U.S. PATENT DOCUMENTS 6,208,873 B1 * 3/2001 Black et al. ............... 455/522
6,507,743 B1 * 1/2003 Abrishamkar et al. ...... 455/458
6,639,907 B2 * 10/2003 Neufeld et al. ............. 370/342
6,650,912 B2 * 11/2003 Chen et al. ................. 455/574
6,687,285 B1 * 2/2004 Jou ............................. 375/133
6,829,485 B2 * 12/2004 Abrishamkar et al. ...... 455/458

* cited by examiner

*Primary Examiner*—Brenda Pham
(74) *Attorney, Agent, or Firm*—The Farrell Law Firm

(57) ABSTRACT

A quick paging method for improving a standby time of a mobile terminal in a shadow area or a handoff region where the mobile terminal receives a pilot signal from a base station over a pilot channel and a quick paging signal from the base station over a quick paging channel, and measures strength of the pilot signal and strength of the quick paging signal. When the pilot signal strength does not exceed a predetermined threshold value, the mobile terminal determines that one or more paging indicator bits transmitted from the base station over the quick paging channel are erased, and informs the base station of the pilot signal strength and the quick paging signal strength. The base station receives the pilot signal strength and the quick paging signal strength from the mobile terminal. When the pilot signal strength does not exceed the predetermined threshold value, the base station controls transmission power of the pilot channel and the quick paging channel using the pilot signal strength and the quick paging signal strength.

3 Claims, 4 Drawing Sheets

QUICK PAGING METHOD IN A SHADOW AREA

PRIORITY

This application claims priority to an application entitled "Quick Paging Method in a Shadow Area" filed in the Korean Industrial Property Office on Sep. 29, 2001 and assigned Ser. No. 2001-61001, the contents of which are incorporated herein by reference.

BACKGROUND OF THE INVENTION

1. Field of the Invention

The present invention relates generally to a mobile communication terminal, and in particular, to a quick paging method for decreasing unnecessary battery consumption by a mobile terminal in a shadow area or a handoff region.

2. Description of the Related Art

A 1×MC (Multiple Carrier) CDMA (Code Division Multiple Access) mobile communications system, which complies with the 3G (third generation) mobile communications standard proposed by the ITU (International Telecommunication Union), not only supports high-speed packet data transmission of 153.6 Kbps or more, but also provides various applications and a long call time while occupying a relatively small space compared with the existing systems. In addition, the 1×MC CDMA mobile communications system provides various functions such as high-speed forward power control and a new modulation/coding scheme.

In particular, a mobile terminal based on the 3G mobile communications standard improves a call standby time using a quick paging channel (QPCH). In the 2G (second generation) mobile communication a terminal is assigned a given time slot out of successive time slots each having the same time period (e.g., 80 ms) in a paging channel. The time slot of the paging channel carries various control messages transmitted from a base station to a mobile terminal, such as a paging message. In a paging method, so as to read a message of a time slot assigned to a mobile terminal itself, the mobile terminal must wake up one time slot ahead of the assigned time slot. However, compared to the paging method, a quick paging method considerably reduces this time and prevents the mobile terminal from waking up unnecessarily using a paging indicator bit, thereby remarkably reducing consumption of power by the mobile terminal in an idle mode.

FIG. 1 illustrates an operational principle of a quick paging channel utilizing two indicator bits. Referring to FIG. 1, when there is no request from a user or a system, a mobile terminal maintains a sleep state 13 in an idle mode so as to prevent unnecessary power consumption. In the sleep state 13, no power is supplied to communication-related circuits of the mobile terminal. A base station repeatedly transmits a first indicator bit 11 and a second indicator bit 12 at given intervals over the quick paging channel, and the mobile terminal receives and demodulates the first indicator bit 11 and the second indicator bit 12 to determine their values. When it is determined that the values of both the first and second indicator bits are '1' or erased, the mobile terminal wakes up to read a time slot assigned thereto (Wake-up state 14) and demodulates the assigned time slot of a paging channel.

Here, strength of a pilot channel signal received by the mobile terminal is used as a criterion for judging whether the indicator bits are erased or not. This is because the strength of the pilot channel signal transmitted by the base station serves as a criterion for determining transmission signal strength of other channels. Equation (1) below is an example of a criterion equation for judging whether the indicator bits are erased.

$$\text{pilot\_}Ec/Io < -10 \text{ dB} \tag{1}$$

In Equation (1), 'pilot_Ec' indicates chip energy of a pilot channel, and 'Io' represents the total reception power.

Meanwhile, in a downtown area where there are many buildings, subways and complicated roads, the mobile terminal can often enter a shadow area where an electric wave cannot be received or is received very weakly. In another case, the mobile terminal can enter a handoff region, a boundary area between cells. In these cases, a state satisfying Equation (1) (i.e., an erasure of the indicator bit) occurs frequently unless the mobile terminal is removed from the shadow area or the handoff region. Whenever the state satisfying Equation (1) happens, the mobile terminal enters a wake-up mode and modulates the paging channel. However, the conventional art does not provide a method for avoiding the frequent wake-up phenomenon in the shadow area or the handoff region, and thus cannot prevent a decrease in efficiency of the quick paging method.

SUMMARY OF THE INVENTION

It is, therefore, an object of the present invention to provide a method for controlling, by a base station, power of a quick paging channel when a mobile terminal frequently demodulates its paging time slot, thereby enhancing efficiency of a quick paging technique.

It is another object of the present invention to provide a method for performing a quick paging operation in a shadow area or in a handoff region.

To achieve the above and other objects, there is provided a quick paging method of a mobile terminal in a shadow area or a handoff region. The quick paging method comprises the steps of: receiving from a base station a pilot signal transmitted over a pilot channel and a quick paging signal transmitted over a quick paging channel in an idle mode, and measuring strength of the pilot signal and strength of the quick paging signal; comparing the pilot signal strength with a predetermined threshold value; and determining whether one or more paging indicator bits transmitted from the base station over the quick paging channel are erased and informing the base station of the pilot signal strength and the quick paging signal strength, when the pilot signal strength does not exceed the predetermined threshold value.

According to another aspect of the present invention, there is provided a quick paging method of a base station, for a mobile terminal in a shadow area or a handoff region. The quick paging method comprises the steps of: receiving pilot signal strength and quick paging signal strength measured by the mobile terminal in an idle mode; and controlling transmission power of a pilot channel and transmission power of a quick paging channel according to the pilot signal strength and the quick paging signal strength, when the pilot signal strength does not exceed a predetermined threshold value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

According to the present invention when a paging indicator bit is erased in a shadow area or a handoff region, a mobile terminal informs a base station of this fact so as to improve a quick paging channel. In addition, if the reception of the paging indicator bit continues even during a period where it is normally not received the mobile terminal determines that it is difficult to improve the quick paging channel and stops the informing operation.

Figure 1:
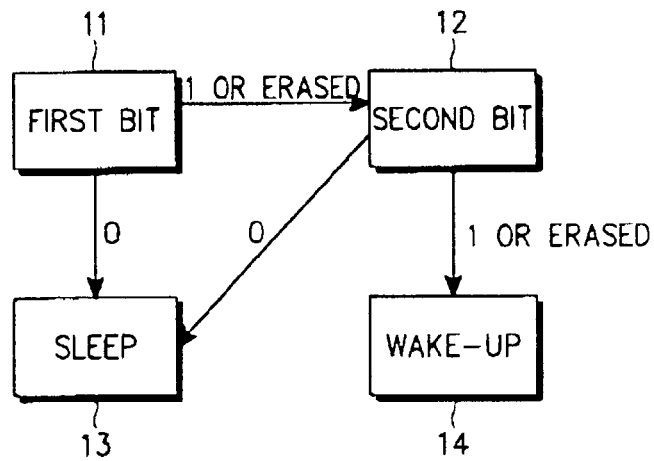
FIG. 1 is a diagram illustrating an operational principle of a quick paging channel utilizing two indicator bits.
Figure 2:
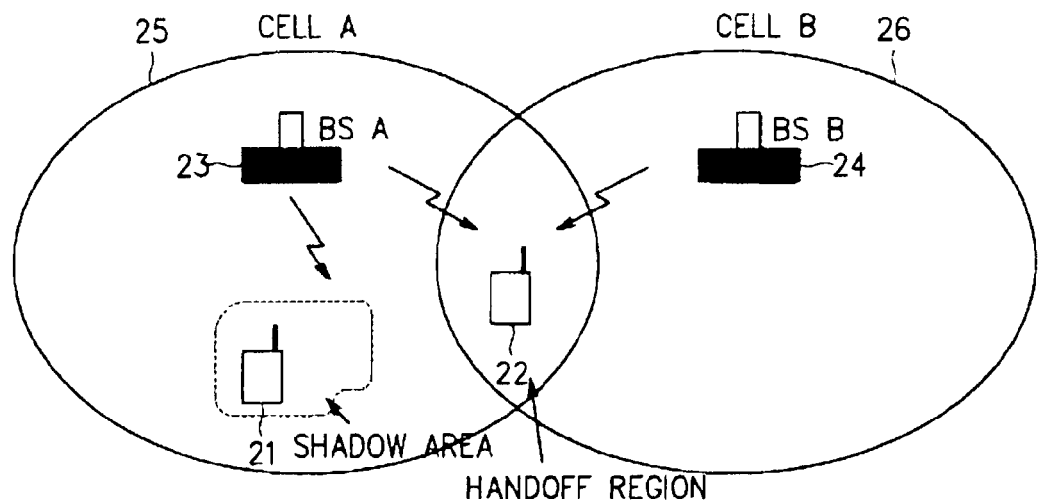
FIG. 2 is a schematic diagram illustrating a structure of the third generation mobile communication system, to which the present invention is applicable.

FIG. 2 illustrates a structure of the third generation mobile communication system, to which the present invention applies. Referring to FIG. 2, a base station (BS_A) 23 services Cell_A 25, while a BS_B 24 services Cell_B 26. A first mobile terminal 21 lies in a shadow area 27 of Cell_A 25, and a second mobile terminal 22 lies in a handoff region 28 at which Cell_A 25 and Cell_B 26 overlap each other. In a worst case scenario, the mobile terminals 21 and 22 are apt to lose paging indicator bits transmitted over quick paging channels, and demodulate all the paging time slots.

In the following description of the present invention, it should be noted that the object of the present invention is to improve a quick paging performance of a mobile terminal in a standby state. That is, the mobile terminal in the standby state is synchronized with only one base station even though it lies in the shadow area 27 or the handoff region 28. Therefore, the present invention can be implemented through a mutual operation between the mobile terminal and the base station synchronized with the mobile terminal.

Figure 3:
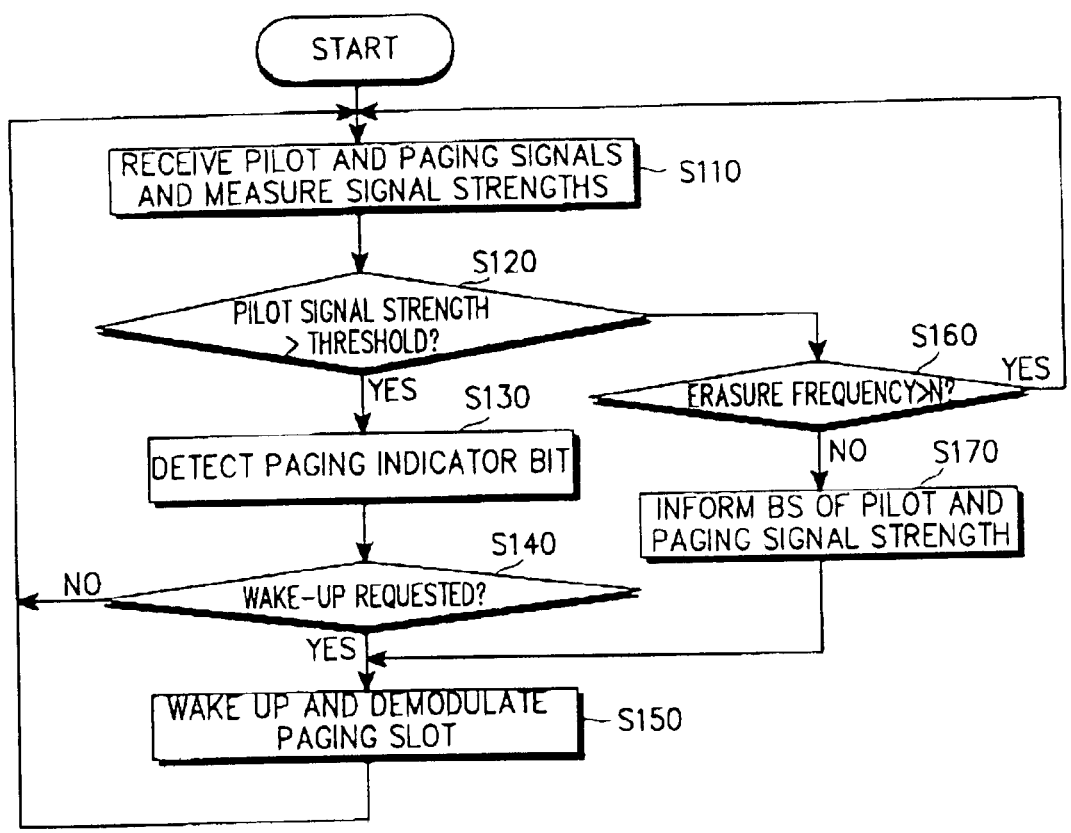
FIG. 3 is a flow chart illustrating a quick paging operation of a mobile terminal according to an embodiment of the present invention.

FIG. 3 illustrates a quick paging operation of a mobile terminal according to an aspect of the present invention, which will now be described in detail.

In step S110, a mobile terminal in an idle mode measures strength of a pilot signal (pilot_Ec/Io) received from a base station over a pilot channel and strength of a quick paging signal (QPCH_Ec/Io) received from the base station over a quick paging channel. In step S120, the mobile terminal compares the measured strength of the pilot signal with a predetermined threshold value (e.g.,-10 dB). If the measured strength of the pilot signal exceeds the predetermined threshold value, the mobile terminal determines that one or more paging indicator bits transmitted over the quick paging channel were not erased, and then proceeds to step S130. Otherwise, if the measured strength of the pilot signal does not exceed the predetermined threshold value, the mobile terminal determines that the paging indicator bits transmitted over the quick paging channel were erased, and then proceeds to step S160.

In step S130, the mobile terminal demodulates the quick paging channel to detect the paging indicator bits. The detected paging indicator bits are used for determining whether a mark-up of the mobile terminal was requested in step S140. If all the detected paging indicator bits are '1' in step S140, the mobile terminal wakes up to demodulate an assigned paging time slot in step S150. Otherwise, if all the detected paging indicator bits are not '1' in step S140, the mobile terminal maintains a sleep state and returns to step S110.

Meanwhile, in step S160, the mobile terminal determines whether the paging indicator bits are successively erased over a predetermined frequency N. If the frequency of the erasures exceeds N, the mobile terminal determines that it is impossible to recover the quick paging channel, and then returns to step S110. Otherwise, if the frequency of the erasures does not exceeds N, the mobile terminal determines that it is necessary to restore the quick paging channel, and then informs the base station of the measured strength of the pilot signal and the measured strength of the quick paging signal in step S170. Here, the measured strength of the pilot signal and the measured strength of the quick paging signal are transmitted to the base station through a PSMM (Pilot Strength Measurement Message) defined by IS-95A/B, the process of which is incorporated herein by reference. The mobile terminal then proceeds to step S150 and wakes up to demodulate the assigned paging time slot.

Figure 4:
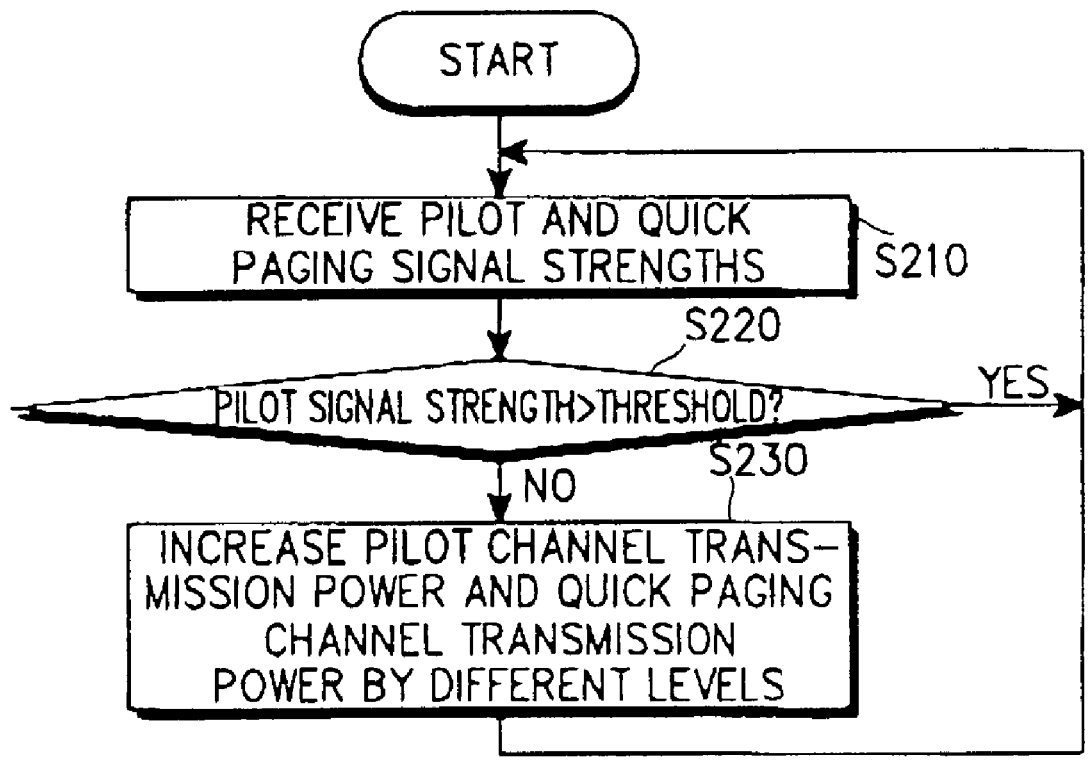
FIG. 4 is a flow chart illustrating a quick paging operation of a base station according to an embodiment of the present invention.

FIG. 4 illustrates a quick paging operation of a base station according to an embodiment of the present invention, which will now be described in detail with reference to FIG. 4.

In step S 210, the base station receives the strength of the pilot signal and the strength of the quick paging signal that are measured by the mobile terminal. In step S220, the base station compares the strength of the pilot signal with a predetermined threshold value (e.g., –10 dB). Here, by way of example, the predetermined threshold value in step S220 is identical to the predetermined threshold value in step S120. If the strength of the pilot signal exceeds the predetermined threshold value, the base station returns to step S210. If the strength of the pilot signal dose not exceed the predetermined threshold value, the base station determines that the mobile terminal lies in the shadow area 23 of handoff region 28 and then controls power of the pilot channel and power of the quick paging channel using the strength of the pilot signal and the strength of the quick paging signal in step S230.

To give an example of the above power control, the base station increases transmission power of the pilot channel and transmission power of the quick paging channel by different levels. For example, if the transmission power of the pilot channel is increased by 1 dB, the transmission power of the quick paging channel is increased by 0.5 dB.

Figure 5:
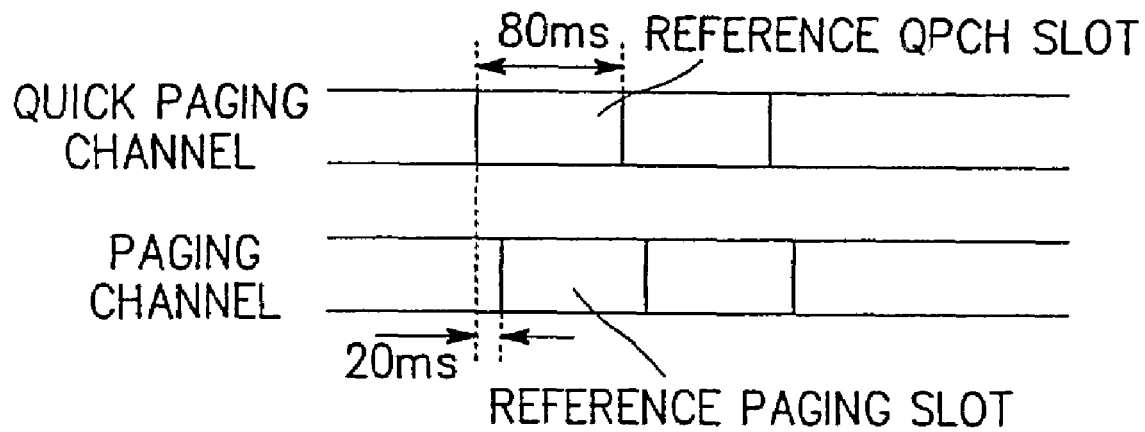
FIG. 5 is a timing diagram of a quick paging channel and a paging channel.
Figure 6:
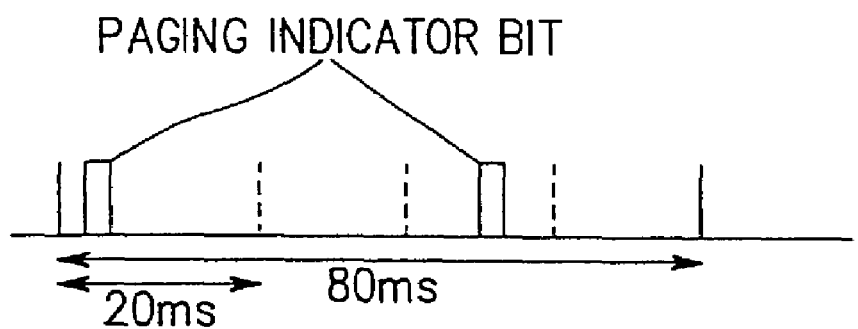
FIG. 6 is a diagram showing paging indicator bits in a quick paging time slot.

The actual values can be varied according to system requirements. FIG. 5 shows a timing diagram of the quick paging channel and the paging channel, and FIG. 6 shows paging indicator bits in a quick paging time slot. Referring to FIG. 5, a time slot of the paging channel is transmitted 20 ms behind a time slot of the quick paging channel in order that the mobile terminal can discern the paging indicator bit of the quick paging channel to determine whether the mobile terminal needs to demodulate the time slot of the paging channel.

Referring to FIG. 6, the base station increases only the transmission power of a partial time period at which the paging indicator bit is located in each 80-ms time slot of the quick paging channel. This considerably reduces a load applied to the base station, compared with a case where the base station increases transmission power of the entire quick paging channel. The mobile terminal is then able to refer to a next-assigned time slot of the paging channel, as shown in FIG. 5.

As described above, the present invention enables the mobile terminal to normally perform a quick paging function in the shadow area or handoff region, by increasing the power of the quick paging channel referred to by the mobile terminal. That is, in the conventional art, there is no way to control transmission power of the base station by informing the base station of a change in reception conditions of the mobile terminal when the mobile terminal is in a quick paging mode of the idle mode. On the contrary, the present invention can improve reception performance of the mobile terminal by informing the base station of poor reception conditions of the mobile terminal in the idle mode. This enables normal use of the quick paging function by the mobile terminal even in the poor reception conditions, thereby increasing a sleep time of the mobile terminal and reducing power consumption of the mobile terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A quick paging method of a mobile terminal, comprising the steps of:
   receiving from a base station a pilot signal transmitted over a pilot channel and a quick paging signal transmitted over a quick paging channel in an idle mode, and measuring strength of the pilot signal and strength of the quick paging signal;
   comparing the pilot signal strength with a predetermined threshold value; and
   determining if one or more paging indicator bits transmitted from the base station over the quick paging channel are erased, and informing the base station of the pilot signal strength and the quick paging signal strength, when the pilot signal strength does not exceed the predetermined threshold value;
   comparing a frequency at which the paging indicator bits are successively erased with a predetermined frequency; and
   determining that it is impossible to recover the quick paging channel and stopping the informing operation, when the frequency of the erasures exceeds the predetermined frequency.

2. The method as claimed in claim 1, further comprising the steps of:
   detecting the paging indicator bits transmitted over the quick paging channel, when the pilot signal strength exceeds the predetermined threshold value; and
   entering a wake-up mode and demodulating a pertinent paging time slot transmitted from the base station over a paging channel, when the detected values of the paging indicator bits correspond to a wake-up request.

3. The method as claimed in claim 1, further comprising the steps of:
   detecting the paging indicator bits transmitted over the quick paging channel, when the pilot signal strength exceeds the predetermined threshold value; and
   entering a wake-up mode and demodulating a pertinent paging time slot transmitted from the base station over a paging channel, when the detected values of the paging indicator bits correspond to a wake-up request.

* * * * *